W. L. MASON.
DENTAL MARKING AND SPACING TOOL.
APPLICATION FILED NOV. 22, 1913.
1,134,692.
Patented Apr. 6, 1915.
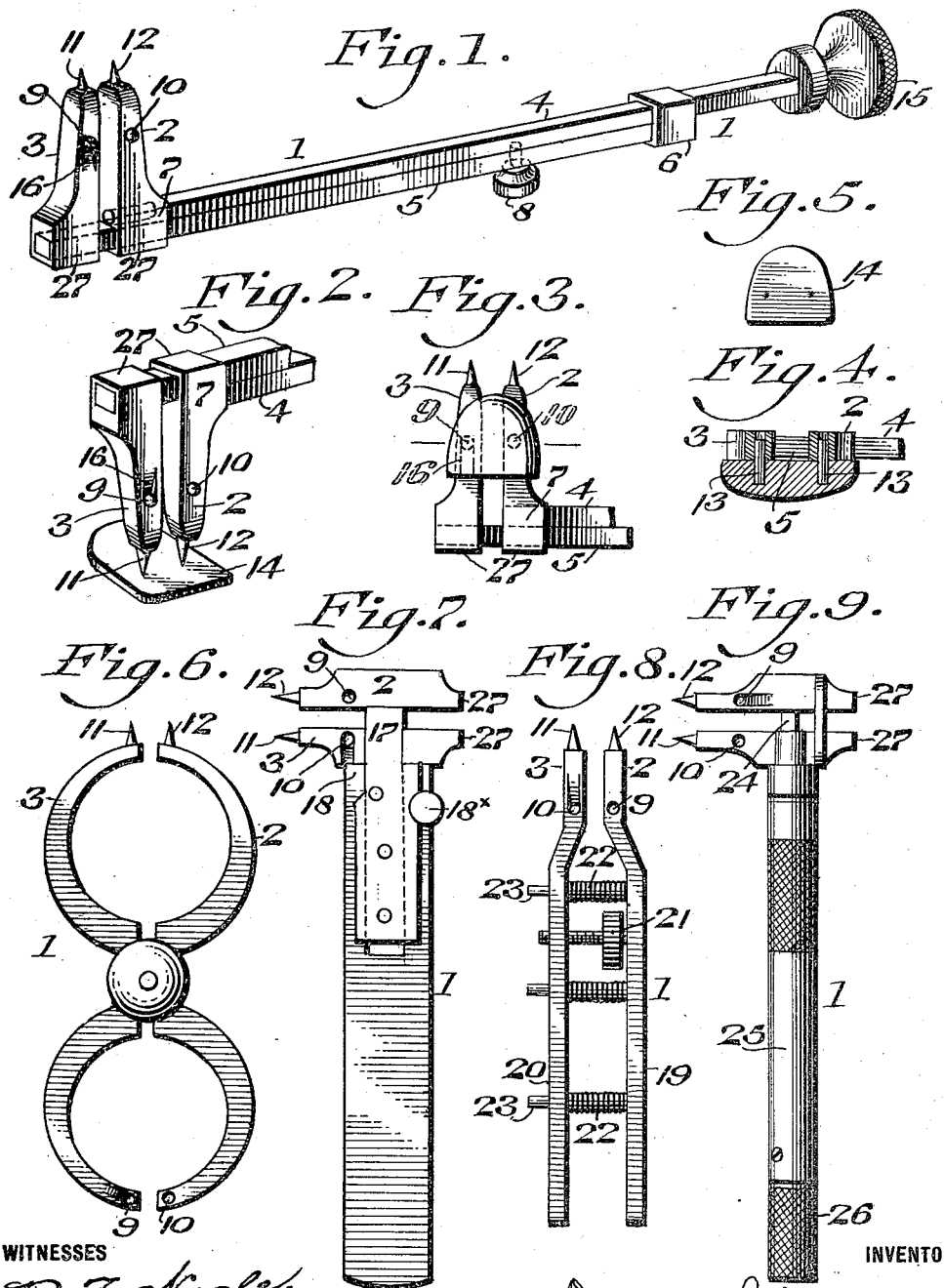

UNITED STATES PATENT OFFICE.

WALTER L. MASON, OF RED BANK, NEW JERSEY, ASSIGNOR TO JAMES W. IVORY, OF PHILADELPHIA, PENNSYLVANIA.

DENTAL MARKING AND SPACING TOOL.

1,134,692.

Specification of Letters Patent. Patented Apr. 6, 1915.

Application filed November 22, 1913. Serial No. 802,416.

*To all whom it may concern:*

Be it known that I, WALTER L. MASON, a citizen of the United States, residing at Red Bank, in the county of Monmouth, State of New Jersey, have invented a new and useful Dental Marking and Spacing Tool, of which the following is a specification.

My invention consists of a dental tool more particularly of the order of calipers or dividers having jaws which are provided with means for supporting the pins of an artificial tooth thereon, and for making indication marks on the metallic facing plate applicable to said tooth in register with said means, so that the openings subsequently made in said facing plate at said marks will be found to be spaced harmoniously with the position of said pins, so that said plate may be fitted true on the tooth over said pins.

The invention is satisfactorily illustrated in the accompanying drawing, but the important instrumentalities thereof may be varied, and so it is to be understood that the invention is not limited to the specific details shown and described.

Figure 1 represents a perspective view of a dental tooth embodying my invention. Fig. 2 represents a perspective view of the jaw portions thereof as applied to a facing plate of a tooth. Fig. 3 represents a side elevation of said portions. Fig. 4 represents a section of the jaws of the tool and of a tooth fitted thereon, on line $x-x$ Fig. 3. Fig. 5 represents an elevation of the facing plate of a tooth having perforations thereon made by the prongs or points of the tool, preparatory to being punched to receive the pins of the tooth. Figs. 6 to 9 inclusive represent side elevations of other embodiments of the invention.

Similar numerals of reference indicate corresponding parts in the figures.

Referring to the drawings:—1 designates a caliper which is formed of a pair of jaws 2 and 3, the sliding bar or shank 4, to the end of which the jaw 2 is secured, the bar or shank 5, to which the end of the jaw 3 is secured, the latter named jaw having on its rear portion the ear 6, whose opening freely receives the shank 4. To the end of said shank 4 opposite to the jaw 2 is secured the ear 7, whose opening freely receives the shank 5. By these means said shanks are adapted to slide on each other, whereby the jaws may be moved to and from each other, so as to be closed and opened for purposes of adjustment as desired.

In order to retain the jaws in their adjusted position, the shank 5 has fitted to it the set screw 8 which is adapted to tighten against the bar 4, the effect of which is evident.

In the sides of the jaws are the recesses 9, 10, and on the ends of said jaws are prongs or points 11 and 12, it being noticed that said prongs or points project outwardly from the jaws in the longitudinal direction of the latter and consequently at a right angle to said recesses 9 and 10, but in right lines drawn from said recesses, so as to be in register therewith.

The operation is as follows:—A tooth is presented to the side of the jaws and its pins 13 are inserted in the recesses 9 and 10, the jaws having been adjusted relatively to each other to permit such insertion of the pins. Then, the screw 8 is tightened, whereby the jaws are rendered immovable. The calipers are now presented to the facing or backing plate 14 of a tooth with the prongs against the same. Then, the calipers are pressed against said plate whereby the prongs prick the latter. The calipers are now removed from the plate and a punch is applied to the plate at the places pricked, so as to form well defined openings in the plate, when the latter may be fitted over the pins upon the tooth, said openings being in the exact position to receive said pins, thus insuring perfect register in applying the facing or backing plate to the tooth, as well as over the pins. The shank 4 has on the outer end thereof the knob 15 which forms a convenient handle for operating said shank and consequently adjusting the jaws 2 and 3 to and from each other.

In order to assist the seating of the pins of the teeth in the recesses 9 and 10, one of the jaws 2 has on its side face adjacent to the recess 9, the channel 16 which leads to the latter, so that when one pin is inserted in the perforation 10 and the tooth properly turned, the other pin rides in said channel to the other recess 9, and so is guided to the latter so as to be inserted easily thereinto.

In Figs. 6, 7, 8 and 9, I show forms of calipers different from the one in Figs. 1, 2, and 3 just above described.

In Fig. 6 showing a common form of double arched-leg calipers, the calipers have curved jaws, 2 and 3, the carriers therefor being connected by the usual friction pivot, the pins 11 and 12 being the ends of one pair of the jaws and the recesses 9 and 10 in the sides of the opposite jaws.

In Fig. 7, the shank 17 of the jaw 2 is slidingly fitted in a groove in the shank 18 with which the jaw 3 is made rigid, said shank 18 forming the handle of the caliper and having fitted to it a screw $18^x$ which is adapted to bear against the shank 17 and retain the latter, and consequently the jaws 2 and 3 in adjusted position.

In Fig. 8, the jaws 2 and 3 are connected with parallel shanks 19 and 20 which are adapted to be brought together for the adjustment of the jaws by the screw 21 which is swiveled on one shank and fitted in a threaded opening in the other shank. Springs 22 mounted on guide pins 23 are interposed between the shanks to separate the latter.

In Fig. 9, the shanks 24 and 25 are fitted to each other telescopically and provided with a swiveled head or nut 26 for operating either shank to separate and close the jaws, as is well known in the ordinary wrench calipers but in all of these Figs. 6, 7, 8 and 9, the jaws are provided with prongs or points 11 and 12, and recesses 9 and 10, as in Figs. 1, 2, and 3 for similar purposes.

When the plate is punched through at the prick-marks the walls of the resultant openings are somewhat flanged, so that they may be fitted nicely over the pins 13 of the tooth, and the flanges may be subjected to a proper burnished tool, or otherwise finished ready for subsequent manipulations, but as is evident, the prongs 11 and 12 may be sufficient to make the openings in said plate, the backs of certain jaws forming the heads 27 to receive blows of a hammer, whereby the prongs may be driven forcibly into and through said plate.

Having thus described my invention what I claim as new and desire to secure by Letters Patent, is:—

1. A dental tool of the character described comprising a pair of jaws, carriers therefor, said jaws being provided with means for receiving and holding the pins of an artificial tooth, and with means for marking a facing plate for said tooth, said means being spaced apart the same distance as said pins.

2. A dental tool of the character described, comprising a pair of jaws having recesses, adjustable carriers therefor, and markers on the jaws spaced apart the same as said recesses and the latter adapted to receive and hold the pins of an artificial tooth, said markers being adapted to make indentations on a facing plate for said tooth in register with said pins for subsequently piercing said plate at said indentations.

3. In a dental tool of the character described, movable jaws provided with recesses to receive and hold the pins of an artificial tooth and with prongs at an angle to said recesses for piercing a facing plate for said tool to register with said pins, said jaws having heads to receive blows for driving said prongs into said plate.

WALTER L. MASON.

Witnesses:
 JOHN A. WIEDERSHEIM,
 N. BUSSINGER.

Copies of this patent may be obtained for five cents each, by addressing the "Commissioner of Patents, Washington, D. C."